(12) United States Patent
Youn et al.

(10) Patent No.: US 11,773,318 B2
(45) Date of Patent: Oct. 3, 2023

(54) CURABLE COMPOSITION INCLUDING QUANTUM DOT, RESIN LAYER USING THE SAME AND DISPLAY DEVICE INCLUDING THE RESIN LAYER

(71) Applicant: Samsung SDI Co., Ltd., Yongin-si (KR)

(72) Inventors: Jinsuop Youn, Suwon-si (KR); Youn Je Ryu, Suwon-si (KR); Bumjin Lee, Suwon-si (KR); Jiyoung Jeong, Suwon-si (KR); Jong Kyu Choi, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 443 days.

(21) Appl. No.: 16/742,861

(22) Filed: Jan. 14, 2020

(65) Prior Publication Data

US 2020/0339876 A1 Oct. 29, 2020

(30) Foreign Application Priority Data

Apr. 24, 2019 (KR) .................. 10-2019-0047931

(51) Int. Cl.
*C09K 11/02* (2006.01)
*C09K 11/70* (2006.01)
*B41M 5/00* (2006.01)

(52) U.S. Cl.
CPC ......... *C09K 11/025* (2013.01); *B41M 5/0023* (2013.01); *C09K 11/703* (2013.01)

(58) Field of Classification Search
None
See application file for complete search history.

(56) References Cited

U.S. PATENT DOCUMENTS 7,794,917 B2  9/2010  Mori et al.
2001/0023078 A1  9/2001  Bawendi et al.
(Continued)

FOREIGN PATENT DOCUMENTS

CN  101391756 A  3/2009
CN  102086396 A  6/2011
(Continued)

OTHER PUBLICATIONS

Taiwanese Patent Office Action and Search Report for corresponding Taiwanese Patent Application No. 109101173, dated Jul. 23, 2020, 14 pages.
(Continued)

*Primary Examiner* — Jeffrey D Washville
(74) *Attorney, Agent, or Firm* — Lewis Roca Rothgerber Christie LLP

(57) ABSTRACT

A curable composition includes (A) a quantum dot; (B) a polymerizable compound; (C) a compound represented by Chemical Formula 1; and (D) a polymerization initiator. A resin layer manufactured utilizing the curable composition, and a display device including the resin layer are also provided.

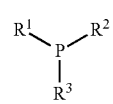

Chemical Formula 1

In Chemical Formula, each substituent is the same as defined in the detailed description.

18 Claims, 1 Drawing Sheet

(56) References Cited

U.S. PATENT DOCUMENTS

| | | |
|---|---|---|
| 2004/0007169 A1 | 1/2004 | Ohtsu et al. |
| 2009/0212258 A1 | 8/2009 | McCairn et al. |
| 2014/0192396 A1 | 7/2014 | Schram et al. |
| 2014/0264196 A1 | 9/2014 | Werner et al. |
| 2016/0011506 A1 | 1/2016 | Gu et al. |
| 2018/0102449 A1 | 4/2018 | Pschenitzka et al. |
| 2018/0179441 A1* | 6/2018 | Park .................. H01L 51/0039 |
| 2018/0354244 A1 | 12/2018 | Jen-La Plante et al. |
| 2018/0355244 A1 | 12/2018 | Luchinger et al. |
| 2019/0011782 A1 | 1/2019 | Pickett et al. |
| 2019/0077954 A1 | 3/2019 | Tangirala et al. |
| 2019/0129302 A1 | 5/2019 | Youn et al. |
| 2020/0248068 A1 | 8/2020 | Choi et al. |
| 2020/0264461 A1 | 8/2020 | Kuwana et al. |

FOREIGN PATENT DOCUMENTS

| | | |
|---|---|---|
| CN | 102277158 A | 12/2011 |
| CN | 102517025 A | 6/2012 |
| CN | 105070849 A | 11/2015 |
| CN | 105131712 A | 12/2015 |
| CN | 105189584 A | 12/2015 |
| CN | 106206972 A | 12/2016 |
| CN | 106468856 A | 3/2017 |
| CN | 106863935 A | 6/2017 |
| CN | 106957645 A | 7/2017 |
| CN | 108102640 A | 6/2018 |
| CN | 108219771 A | 6/2018 |
| CN | 108445713 A | 8/2018 |
| CN | 109994619 A | 7/2019 |
| JP | 2002-121549 A | 4/2002 |
| JP | 2003-137912 A | 5/2003 |
| JP | 2009-132771 A | 6/2009 |
| JP | 2010-118434 A | 5/2010 |
| JP | 2011-122033 A | 6/2011 |
| JP | 2016-98375 A | 5/2016 |
| JP | 2017-32918 A | 2/2017 |
| JP | 6093179 B2 | 3/2017 |
| JP | 2017-106006 A | 6/2017 |
| JP | 2017-137451 A | 8/2017 |
| JP | 6236412 B2 | 11/2017 |
| JP | 2018-91924 A | 6/2018 |
| JP | 2018-131613 A | 8/2018 |
| JP | 2018-153915 A | 10/2018 |
| JP | 2020-41080 A | 3/2020 |
| JP | 2020-105491 A | 7/2020 |
| JP | 2020-118971 A | 8/2020 |
| KR | 1992-7002502 A | 9/1992 |
| KR | 1994-0005617 B1 | 6/1994 |
| KR | 1995-7000359 A | 1/1995 |
| KR | 1995-0011163 B1 | 9/1995 |
| KR | 10-2009-0078099 A | 7/2009 |
| KR | 10-2014-0072682 A | 6/2014 |
| KR | 10-2015-0052759 A | 5/2015 |
| KR | 10-2015-0098691 A | 8/2015 |
| KR | 10-2016-0022158 A | 2/2016 |
| KR | 10-2016-0097445 A | 8/2016 |
| KR | 10-2016-0114292 A | 10/2016 |
| KR | 10-2016-0119149 A | 10/2016 |
| KR | 10-2016-0135763 A | 11/2016 |
| KR | 10-2016-0142100 A | 12/2016 |
| KR | 10-2017-0006024 A | 1/2017 |
| KR | 10-2017-0022951 A | 3/2017 |
| KR | 10-2017-0028306 A | 3/2017 |
| KR | 10-2017-0035688 A | 3/2017 |
| KR | 10-2017-0060400 A | 6/2017 |
| KR | 10-2017-0075478 A | 7/2017 |
| KR | 10-2017-0101002 A | 9/2017 |
| KR | 10-2017-0106048 A | 9/2017 |
| KR | 10-2017-0141005 A | 12/2017 |
| KR | 10-2018-0025248 A | 3/2018 |
| KR | 10-2018-0027617 A | 3/2018 |
| KR | 10-2018-0059724 A | 6/2018 |
| KR | 10-2018-0080507 A | 7/2018 |
| KR | 10-2018-0092671 A | 8/2018 |
| KR | 10-2018-0111082 A | 10/2018 |
| KR | 10-1895909 B1 | 10/2018 |
| KR | 10-1909541 B1 | 10/2018 |
| KR | 10-2019-0004536 A | 1/2019 |
| KR | 10-2019-0062442 A | 6/2019 |
| KR | 10-2019-0102857 A | 9/2019 |
| KR | 10-2020-0041937 A | 4/2020 |
| KR | 10-2020-0060430 A | 5/2020 |
| KR | 10-2226069 B1 | 3/2021 |
| KR | 10-2296792 B1 | 8/2021 |
| TW | 201213452 A1 | 4/2012 |
| TW | 201239044 A1 | 10/2012 |
| TW | 201243002 A1 | 11/2012 |
| TW | 201634604 A | 10/2016 |
| TW | 201643221 A | 12/2016 |
| TW | 201730671 A | 9/2017 |
| TW | 201809216 A | 3/2018 |
| TW | 201825648 A | 7/2018 |
| TW | 201835298 A | 10/2018 |
| TW | 201835652 A | 10/2018 |
| TW | 201923461 A | 6/2019 |
| WO | WO 2000/017656 A1 | 3/2000 |
| WO | 2005/093422 A2 | 10/2005 |
| WO | 2017/002833 A1 | 1/2017 |
| WO | WO 2017/008442 A | 1/2017 |
| WO | WO 2017/019789 A1 | 2/2017 |
| WO | WO 2017/150112 A1 | 9/2017 |
| WO | 2018/051961 A1 | 3/2018 |
| WO | 2018/071308 A1 | 4/2018 |
| WO | 2018/105545 A1 | 6/2018 |
| WO | WO 2018/226925 A1 | 12/2018 |
| WO | WO 2019/084119 A1 | 5/2019 |

OTHER PUBLICATIONS

Taiwanese Patent Office Action and Search Report for corresponding Taiwanese Patent Application No. 109101997, dated Jul. 23, 2020, 16 pages.
English Abstract for foreign reference KR 10-2019-0102857 A.
English translation of Japanese Office Action, for Patent Application No. 2020-006789, dated Jan. 5, 2021, 3 pages.
English translation of Japanese Office Action, for Patent Application No. 2020-006789, dated Sep. 28, 2021, 3 pages.
English translation of Korean Office Action, for Patent Application No. 10-2019-0007594, dated May 7, 2021, 11 pages.
English translation of Korean Office Action, for Patent Application No. 10-2019-0014094, dated Feb. 28, 2021, 6 pages.
English translation of Korean Office Action, for Patent Application No. 10-2019-0047931, dated Jul. 22, 2021, 5 pages.
International Search Report issued in corresponding International Application No. PCT/KR2018/006007, dated Sep. 4, 2018, 3 pages.
Japanese Decision for grant dated Dec. 21, 2021, for Application No. JP 2020-521309, 3 pages.
Japanese Office Action dated Apr. 27, 2021 for Application No. JP 2020-521309, 4 pages.
Korean Intellectual Property Office Action for corresponding Korean Patent Application No. 10-2018-0023868, dated Jun. 1, 2020, 7 pages.
Korean Notice of Allowance dated Apr. 21, 2021 for Application No. KR 10-2018-0023867, 2 pages.
Korean Notification of Third Party Observations, for Patent Application No. KR 10-2021-0088862, dated Jan. 26, 2022, 2 pages.
Korean Office Action dated Aug. 19, 2020, issued in corresponding Korean Patent Application No. 10-2018-0023867, 6 pages.
Office Action (including a search report) dated Dec. 29, 2021, of the corresponding Chinese Patent Application No. 201880063935.0, 13pp.
"Study on the properties of QDs with different ligand structures", May 26, 2013, 80pp.
Taiwanese Office Action dated Sep. 9, 2019, for corresponding Taiwanese Patent Application No. 107135471 (9 pages).
U.S. Office Action from U.S. Appl. No. 16/155,691, dated Aug. 27, 2021, 12 pages.
U.S. Office Action from U.S. Appl. No. 16/155,691, dated Dec. 13, 2021, 9 pages.

(56) References Cited

OTHER PUBLICATIONS

U.S. Restriction Requirement from U.S. Appl. No. 16/155,691, dated May 14, 2021, 6 pages.
Beland, Vanessa A., et al., "Antimony-functionalized phosphine-based photopolymer networks," Angewandte Chemie International Edition, 2018, 7 pages.
Taiwanese Office Action dated Dec. 2, 2020, issued in corresponding Taiwanese Patent Application No. 109101093 (6 pages).
English translation of Japanese Decision for Grant for JP Application No. JP 2020-521309 dated Dec. 21, 2021, 3 pages.
English translation of Japanese Office Action for JP Application No. JP 2020-521309, dated Apr. 27, 2021, 4 pages.
English translation of Korean Intellectual Property Office Action for KR Application No. 10-2018-0023868 dated Jun. 1, 2020, 7 pages.
English translation of Korean Notice of Allowance for KR Application No. 10-2018-0023867 dated Apr. 21, 2021, 2 pages.
English translation of Korean Notification of Third Party Observations for KR Application No. 10-2021-0088862 dated Jan. 26, 2022, 2 pages.
English translation of Korean Office Action for KR Application No. 10-2018-0023867 dated Aug. 19, 2020, 6 pages.
Korean Office Action for KR Application No. 10-2019-0007594 dated May 28, 2022, 8 pages.
Japanese Office Action dated Jan. 5, 2021, issued in Japanese Patent Application No. 2020-006250 (4 pages).
Japanese Office Action dated Jan. 5, 2021, issued in Japanese Patent Application No. 2020-006789 (3 pages).
Japanese Office Action dated Feb. 16, 2021, issued in Japanese Patent Application Appl. No 2020-029726 (3 pages).
Taiwanese Office Action dated Feb. 22, 2021, issued in Taiwanese Patent Application No. 109101173 (9 pages).
Korean Office Action dated Feb. 28, 2021, issued in Korean Patent Application No. 10-2019-0014094 (6 pages).
Beland, Vanessa A., et al., "Antimony-functionalized phosphine-based photopolymer networks," Angewandte Chemie International Edition, vol. 57, Issue 40, 2018, 7 pages.
Korean Office Action dated Jul. 22, 2021, issued in corresponding Korean Patent Application No. 10-2019-0047931 (4 pages).
Japanese Office Action dated Sep. 28, 2021, issued in Japanese Patent Application No. 2020-006789 (3 pages).
Korean Office Action dated May 7, 2021, issued in Korean Patent Application No. 10-2019-0007594 (10 pages).
Korean Notice of Allowance dated Jun. 18, 2021, issued in Korean Patent Application No. 10-2019-0014094 (2 pages).
Beland, Vanessa, et al, "Antimony-Functionalized Phosphine-Based Photopolymer Networks," Angew Chem., 2018, vol. 130, 5 pages.
International Search Report and Written Opinion of the International Searching Authority dated Apr. 13, 2020, for International Application No. PCT/KR2020/000037 (7 pages).
Chinese Office Action dated Dec. 1, 2021, issued in Chinese Patent Application No. 202010042364.1. (9 pages).
Dawei Deng, et al., Forming highly fluorescent near-infrared emitting PbS quantum dots in water using glutathione as surface-modifying molecule, Journal of Colloid and Interface Science, 2012, pp. 234-240, vol. 367, Iss. 1, Elsevier Inc.

U.S. Office Action from U.S. Appl. No. 16/155,691, dated Apr. 11, 2022, 8 pages.
U.S. Office Action from U.S. Appl. No. 16/742,875, dated Apr. 11, 2022, 13 pages.
U.S. Office Action dated Dec. 14, 2021, issued in U.S. Appl. No. 16/742,875 (12 pages).
Notice of Allowance for U.S. Appl. No. 16/155,691 dated Jul. 14, 2022, 8 pages.
Office Action for U.S. Appl. No. 16/742,875 dated Jul. 18, 2022, 10 pages.
Ping, He, "Decorative Materials," 1st Edition, Southeast University Press, 2nd printing, Aug. 2002, Abstract, 5 pages.
Chengbin, Mu, "Communication Optical Fiber and Cable Materials and Industry Development," 1st Edition, Tongji University Press, Jun. 2015, Abstract, 4 pages.
Chinese Office Action dated Jun. 13, 2022, issued in Chinese Patent Application No. 202010042364.1 (8 pages).
U.S. Restriction Requirement, dated Aug. 19, 2022, issued in U.S. Appl. No. 16/742,855 (7 pages).
Third Party Observations dated Aug. 2, 2022, issued in Korean Patent Application No. 10-2021-0088862 (2 pages).
Korean Office Action, with English translation, dated Mar. 28, 2022 for Korean Patent Application No. 10-2019-0007594 (17 pages).
U.S. Notice of Allowance dated Oct. 20, 2022, issued in U.S. Appl. No. 16/155,691 (8 pages).
Notice of Allowance for U.S. Appl. No. 16/742,875 dated Nov. 3, 2022, 7 pages.
Office Action for U.S. Appl. No. 16/742,855 dated Dec. 2, 2022, 15 pages.
Restriction Requirement for U.S. Appl. No. 16/742,857 dated Nov. 9, 2022, 9 pages.
Breus, Vladimir V., et al., "Quenching of CdSe-ZnS Core-Shell Quantum Dot Luminescence by Water-Soluble Thiolated Ligands," J. Phys. Chem. C, 2007, pp. 18589-18594.
Zhu, Huaping, et al., "Synthesis and Optical Properties of Thiol Functionalized CdSe/ZnS(Core/Shell) Quantum Dots by Ligand Exchange," Journal of Nanomaterials, 2014, 15 pages.
Chinese Notice of Allowance dated Oct. 21, 2022, issued in Chinese Patent Application No. 201880063935.0 (5 pages).
Korean Office Action dated Dec. 28, 2022, issued in Korean Patent No. 10-2296792 (Korean Application No. 10-2019-0014094), 6 pages.
U.S. Notice of Allowance dated Jan. 19, 2023, issued in U.S. Appl. No. 16/155,691 (7 pages).
LI Hua, et al., "Research Progress in Synthesis and Application of Quantum Dots," Journal of Jilin Institute of Architecture & Civil Engineering, Dec. 2014, 4 pages.
Chinese Office Action, Search Report, dated Feb. 25, 2023, issued in corresponding Chinese Patent Application No. 202010022282.0 (3 pages).
Japanese Notice of Allowance dated Feb. 21, 2023, issued in corresponding Japanese Patent Application No. 2021-121430 (3 pages).
U.S. Final Office Action dated Apr. 28, 2023, issued in U.S. Appl. No. 16/742,855 (18 pages).

\* cited by examiner

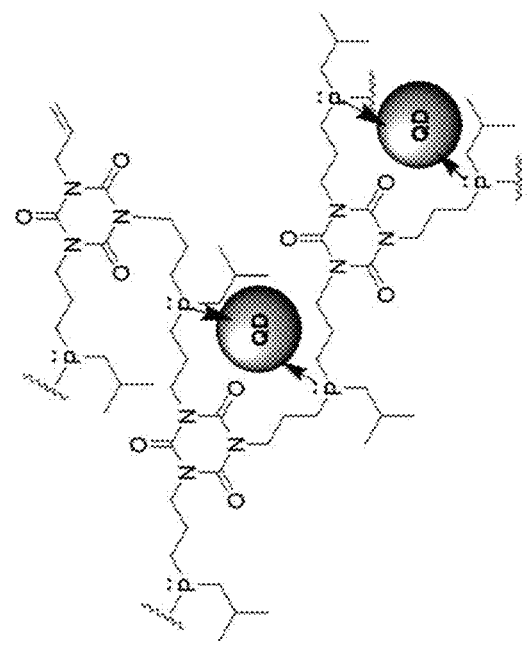
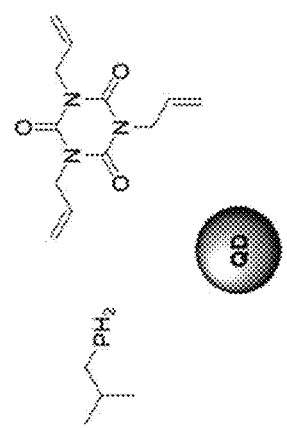

CURABLE COMPOSITION INCLUDING QUANTUM DOT, RESIN LAYER USING THE SAME AND DISPLAY DEVICE INCLUDING THE RESIN LAYER

CROSS-REFERENCE TO RELATED APPLICATION

This application claims priority to and the benefit of Korean Patent Application No. 10-2019-0047931, filed in the Korean Intellectual Property Office on Apr. 24, 2019, the entire content of which is incorporated herein by reference.

BACKGROUND

1. Field

This disclosure relates to a curable composition including a quantum dot, a resin layer utilizing the same, and a display device including the resin layer.

2. Description of the Related Art

In general, a color filter is utilized for a liquid crystal display (LCD), as an optical filter for a camera, and/or the like. It is fabricated by coating a fine region colored with three or more colors on a charge coupled device or a transparent substrate. That is, the color filter may be fabricated by coating a colored thin film (e.g., with three or more colors) directly on an electrical device or on a transparent substrate. Colored thin films may be manufactured (e.g., commonly manufactured) utilizing dying, printing, pigment dispersion, inkjet methods, and/or the like.

The dying process involves forming a colored film by forming an image with a dying agent such as a natural photosensitive resin (such as gelatin and/or the like), an amine-modified polyvinyl alcohol, an amine-modified acryl-based resin, and/or the like on a substrate, and then dying (e.g., coloring) the image with dyes (e.g., direct dyes). In the dying process, the suitable (e.g., generally-utilized) dye and the resin may have good clearance (e.g., transparency) and good dispersion, but light resistance, water resistance, and/or heat resistance may be reduced.

The printing process involves forming a colored thin film by printing an ink (prepared by dispersing a pigment in a thermally-curable or photocurable resin) and curing it with heat or light. This process may decrease material cost compared with other related art processes, but has a difficulty in forming a fine (e.g., sharp) and exact image.

The pigment dispersion process is to form a colored film by repeating a series of processes such as coating, exposing to light, developing, and curing a photopolymerizable composition including a coloring agent on a transparent substrate with a black matrix. This pigment dispersion process may improve heat resistance and durability of a color filter and maintain a uniform thickness of the film. In addition, it is generally adopted, because it is not only easy to apply but may also accomplish a fine pattern.

However, the pigment dispersion process has a difficulty in terms of yield (e.g., managing a yield), because each color of red (R), green (G), and blue (B) requires coating, exposure, development, and curing respectively in order to form a pixel, which makes a whole process line longer and increases needed control factors (e.g., the number of control factors) among the processes.

Accordingly, this related art pigment dispersion process has recently been replaced with several new processes. An inkjet printing task is representatively included therein. The inkjet printing process involves forming a light proof layer (such as a black matrix and/or the like) on a glass substrate, and implanting (e.g., printing) ink in a pixel space. This process does not require a process such as coating, exposure, development, and/or the like, and may thereby decrease the amount of materials required for the processes and simplify the whole process.

When a color filter is manufactured utilizing such an inkjet ink, it is usual for at least two pigments to be mixed so as to ensure required color characteristics. For example, when the red filter is fabricated, the main pigment includes a diketopyrrolopyrol-based red pigment such as C.I. pigment red No. 254. In addition, an auxiliary pigment may be an anthraquinone-based red pigment, for example, C.I. Pigment Red 177, or an isoindolinone-based yellow pigment, for example, C.I. Pigment Yellow 139. As circumstances require, other yellow and orange pigments, for example, C.I. Pigment Yellow 138, C.I Pigment Yellow 150, C.I. Pigment Orange 38, and/or the like may be added. The pigments are generally utilized as a color filter material because of their suitable (e.g., excellent) color characteristics, light resistance, and heat resistance; however, the requirement on physical properties becomes higher as the application fields of the LCD color filter are increased (e.g., broadened). Accordingly, in order to improve the color characteristics (such as the brightness and the color purity) when transmitting light, research on pulverizing and finely-dispersing the pigments have progressed, but expression of the color characteristics of color filters by only combining these pigments is limited. That is, the color characteristics of color filters obtained only by combining these pigments are limited.

Accordingly, an attempt to replace the pigments with a quantum dot has been continuously made, and as a result, the quantum dot has been established as a new trend in a display field and is applied to various suitable display devices, electronic devices, and/or the like in addition to TV and LED. The quantum dot represented as CdSe, InP, and/or the like is very actively researched in terms of emission efficiency (a quantum yield), and currently, synthesis methods of realizing the emission efficiency close to 100% are introduced and succeeded in commercialization of QD SUHDTV (manufactured by actually applying a quantum dot sheet to TV). However, because the QD SUHDTV has a limit as a filtering type product (e.g., a product that uses a filter) wherein light is filtered by a color filter layer, research on developing a next version quantum dot TV, which is not the filtering type in the color filter layer but a self-emitting type (e.g., a self-emitting layer), is being made by including the quantum dot (but excluding a related art colorant such as a pigment, a dye, and/or the like) in a color filter layer of related art LED TV.

In addition, applying the quantum dot in various kinds of display devices is being examined, but in order to realize processability and performance in all cases, formulation with an organic material composition needs to be adjusted. However, because the quantum dots are not sufficiently stabilized (passivated) through curing (thermal curing or photocuring) when mixed with a related art organic material composition (a monomer, a binder resin, an initiator, other additives, and/or the like), quenching of the quantum dots may occur (e.g., necessarily occurs) in the process. Accordingly, development of an organic material composition capable of sufficiently stabilizing the quantum dots and reducing or preventing the quenching is emerged as a main issue for development of a display device utilizing the quantum dots.

On the other hand, recent needs for a non-solvent curable composition more easily applied to an actual process than a solvent based curable composition have been further increased, and accordingly, research on the non-solvent curable composition including the quantum dot is being actively pursued.

SUMMARY

An aspect according to embodiments of the present disclosure is directed toward providing a curable composition including quantum dots that sufficiently stabilizes the quantum dots during thermal curing and/or photocuring processes, suppresses quenching of the quantum dots, and thus improves high temperature stability.

Another aspect according to embodiments of the present disclosure is directed toward providing a resin layer manufactured utilizing the curable composition.

Another aspect according to embodiments of the present disclosure is directed toward providing a display device including the resin layer.

According to an embodiment, a curable composition includes (A) a quantum dot; (B) a polymerizable compound; (C) a compound represented by Chemical Formula 1; and (D) a polymerization initiator.

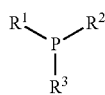

Chemical Formula 1

In Chemical Formula 1, $R^1$ to $R^3$ are each independently a hydrogen atom, a substituted or unsubstituted C1 to C20 alkyl group, or a substituted or unsubstituted C6 to C20 aryl group, and at least one of $R^1$ to $R^3$ is a substituted or unsubstituted C1 to C20 alkyl group.

At least one selected from $R^1$ to $R^3$ may be a substituted or unsubstituted C1 to C20 alkyl group and at least one selected from a remaining $R^1$ to $R^3$ may be a hydrogen atom.

The polymerizable compound may be a polymerizable monomer having a carbon-carbon double bond at a terminal end of the polymerizable monomer.

The polymerizable compound may be a polymerizable monomer having at least one selected from a functional group represented by Chemical Formula 2-1 and a functional group represented by Chemical Formula 2-2 at the terminal end.

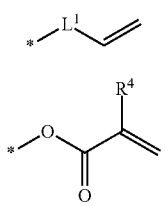

Chemical Formula 2-1

Chemical Formula 2-2

In Chemical Formula 2-1 and Chemical Formula 2-2, $L^1$ is a substituted or unsubstituted C1 to C20 alkylene group, and $R^4$ is a hydrogen atom or a substituted or unsubstituted C1 to C20 alkyl group.

The quantum dot may be to absorb light in about 360 nm to about 780 nm and emit fluorescence in a wavelength of about 500 nm to about 700 nm.

The quantum dot may include a green quantum dot and/or a red quantum dot.

The curable composition may further include a light diffusing agent.

The light diffusing agent may include barium sulfate, calcium carbonate, titanium dioxide, zirconia, or a combination thereof.

The curable composition may further include at least one of a binder resin and a solvent.

The binder resin may include an acryl-based binder resin, a cardo-based binder resin, or a combination thereof.

The solvent may include propylene glycol monomethylether acetate, dipropylene glycol methylether acetate, cyclohexyl acetate, ethanol, ethylene glycoldimethylether, ethylene diglycolmethylethylether, diethylene glycoldimethylether, dimethyl acetamide, 2-butoxyethanol, N-methylpyrrolidine, N-ethylpyrrolidine, propylene carbonate, γ-butyrolactone, or a combination thereof.

The curable composition may further include malonic acid; 3-amino-1,2-propanediol; a silane-based coupling agent; a leveling agent; a fluorine-based surfactant; or a combination thereof.

According to another embodiment, a resin layer is manufactured utilizing the curable composition.

According to another embodiment, a display device includes the resin layer.

Other embodiments of the present disclosure are included in the following detailed description.

In the curing (thermal curing and/or photocuring) process, which is one of the actual processes, the quantum dot is stably passivated (e.g., protected) to suppress quenching of the quantum dot, thereby improving reliability of a display device by reducing or preventing deterioration of quantum efficiency of the quantum dot.

BRIEF DESCRIPTION OF THE DRAWING

The drawing is a diagram illustrating a concept that quantum dots constituting a curable composition according to an embodiment is stabilized by a cross-linking body (e.g., cross-linked structure) formed by photocuring.

DETAILED DESCRIPTION

Hereinafter, embodiments of the present disclosure are described in more detail. However, these embodiments are exemplary, the present disclosure is not limited thereto and the subject matter of the present disclosure is defined by the scope of claims and equivalents thereof.

As used herein, when specific definition is not otherwise provided, the term "alkyl group" refers to a C1 to C20 alkyl group, the term "alkenyl group" refers to a C2 to C20 alkenyl group, the term "cycloalkenyl group" refers to a C3 to C20 cycloalkenyl group, the term "heterocycloalkenyl group" refers to a C3 to C20 heterocycloalkenyl group, the term "aryl group" refers to a C6 to C20 aryl group, the term "arylalkyl group" refers to a C6 to C20 arylalkyl group, the term "alkylene group" refers to a C1 to C20 alkylene group, the term "arylene group" refers to a C6 to C20 arylene group, the term "alkylarylene group" refers to a C6 to C20 alkylarylene group, the term "heteroarylene group" refers to a C3 to C20 heteroarylene group, and the term "alkoxylene group" refers to a C1 to C20 alkoxylene group.

As used herein, when specific definition is not otherwise provided, the term "substituted" refers to replacement of at least one hydrogen atom by a substituent selected from a halogen atom (F, Cl, Br, or I), a hydroxyl group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, and a combination thereof.

As used herein, when specific definition is not otherwise provided, the term "hetero" refers to inclusion of at least one hetero atom selected from N, O, S and P, in addition to carbon atom(s), in the chemical formula.

As used herein, when specific definition is not otherwise provided, the term "(meth)acrylate" refers to both "acrylate" and "methacrylate", and the term "(meth)acrylic acid" refers to both "acrylic acid" and "methacrylic acid."

As used herein, when specific definition is not otherwise provided, the term "combination" refers to mixing or copolymerization.

As used herein, unless a specific definition is otherwise provided, a hydrogen atom is bonded at the position where a chemical bond is supposed to exist but not drawn in a chemical formula.

As used herein, a cardo-based resin refers to a resin including at least one functional group represented by one selected from Chemical Formula 3-1 to Chemical Formula 3-11 in the backbone of the resin.

As used herein, when specific definition is not otherwise provided, "*" indicates a point where the same or different atom or Chemical Formula is linked.

A curable composition according to an embodiment includes (A) a quantum dot; (B) a polymerizable compound; (C) a compound represented by Chemical Formula 1; and (D) a polymerization initiator.

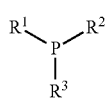

Chemical Formula 1

In Chemical Formula 1, $R^1$ to $R^3$ are each independently a hydrogen atom, a substituted or unsubstituted C1 to C20 alkyl group, or a substituted or unsubstituted C6 to C20 aryl group, and at least one of $R^1$ to $R^3$ is a substituted or unsubstituted C1 to C20 alkyl group.

Various kinds of panels are being developed by utilizing a concept of applying the quantum dot to a related art LCD-based TV (the filtering kind). Recently, development of a quantum dot-glass (QD-glass) (by coating and curing a quantum dot-containing resin composition on a glass light guide panel instead of a related art PMMA light guide panel) has been made to improve luminance and/or the like, and as a request level from the related market is increasingly higher, a demand on a panel capable of maintaining a basic panel operation mechanism and optical characteristics of QLED TV (manufactured by applying a quantum dot sheet), and concurrently (or simultaneously) being thinner and further having an effect of improving luminance is greatly increased.

In general, in order to provide a composition corresponding to the request level, the quantum dots should present in the composition stably through any process. In other words, the stabilization of the quantum dots is an important factor for providing a display device having suitable (e.g., excellent) reliability. That is, development of TV by applying the quantum dot-containing curable composition depends (e.g., essentially depends) on how much (e.g., how well) the quantum dots are stabilized in patterning and thermal processes (e.g., in the patterning process and thermal treatment process) of the composition and/or the like, and thus how much (e.g., how well) the quantum dots maintain the emission efficiency and realize patterning properties.

In general, in order to stabilize the quantum dots, a material playing a role of a ligand of the quantum dots, for example, a monomolecular compound (such as carboxylic acid, thiol, amine, and/or the like), an oligomer thereof, or a polymer material including the same (e.g., same functional group) is added thereto. These ligand materials coordinate (e.g., bonds with) the quantum dots in the cured composition and thus stabilize atoms at the outermost (e.g., outermost layer) of the quantum dots and suppress quenching of the quantum dots. However, this addition of the ligand materials as a kind of additive may be performed, unless processability and properties of the entire quantum dot-containing composition are deteriorated. That is, the addition of the ligand materials should be utilized while not causing deterioration in processability and properties of the entire quantum dot-containing composition. Accordingly, an added amount of the ligand materials is limited. In addition, an insufficient concentration of the ligand materials (capable of stabilizing the quantum dots) may hinder suitable (e.g., perfect) passivation (e.g., stabilization) of the quantum dots.

An embodiment relates to a curable composition including quantum dots (recently getting established as a new technology trend in a display field), wherein the composition includes the compound represented by Chemical Formula 1, a polymerizable compound, and a polymerization initiator along with the quantum dots, wherein the compound represented by Chemical Formula 1 and the polymerizable compound form a cross-linking body (e.g., a cross-linked structure) by the polymerization initiator during the curing process, and in the cross-linking body, the phosphorus atom (P) has a lone pair of electrons at every linker (e.g., cross-linking point) and thus coordinates and stabilizes the quantum dots.

In one embodiment, referring to the drawing, after mixing and formulating the quantum dots with a mono-alkyl phosphine compound, a monomer having an alkenyl group at the terminal end, and a photopolymerization initiator, the mixture is coated on a substrate and irradiated by UV, where an addition reaction between the phosphine and the alkenyl group occurs, and accordingly, the cross-linking body is formed due to a novel bond between phosphorous atoms (P) and carbon atoms (C). As a result, there may be the phosphine having a lone pair of electrons at every linker of the cross-linking body, which works as a network capable of coordinating and stabilizing the quantum dots. In a cured product system of this novel structure (a curing backbone (e.g., backbone of the cured composition) itself may coordinate the quantum dots), the ligand material may be free from the limit in amount (unlike a related art additive), and because binding sites are linked to the curing backbone itself, a quantum dot-ligand system (QD-ligand system) more stable to heat, light, oxygen, and/or the like may be obtained, and ultimately, reliability of a display device manufactured by applying the composition according to an embodiment is improved.

Also, the curable composition according to an embodiment may be a solvent based curable composition or a non-solvent curable composition.

For example, the solvent based curable composition may further include a solvent, or a solvent in addition to a quantum dot, a photopolymerizable compound, the compound represented by Chemical Formula 1, and a photopolymerization initiator.

For example, the non-solvent curable composition may include (e.g., be composed of) a quantum dot, a photopolymerizable compound, the compound represented by Chemical Formula 1, and a photopolymerization initiator; a quantum dot, a photopolymerizable compound, the compound represented by Chemical Formula 1, a photopolymerization initiator, and a light diffusing agent; or a quantum dot, a photopolymerizable compound, the compound represented by Chemical Formula 1, a photopolymerization initiator, a light diffusing agent, and other additives that will be described later.

Hereinafter, each component is specifically described.

(A) Quantum Dot

The quantum dot absorbs light in a wavelength region of about 360 nm to about 780 nm, for example, about 400 nm to about 780 nm, and emits fluorescence in a wavelength region of about 500 nm to about 700 nm, for example, about 500 nm to about 580 nm, or about 600 nm to about 680 nm. That is, the quantum dot may have a maximum fluorescence emission wavelength ($\lambda_{em}$) at about 500 nm to about 680 nm.

The quantum dots may each independently have a full width at half maximum (FWHM) of about 20 nm to about 100 nm, for example, about 20 nm to about 50 nm. When the quantum dot has a full width at half maximum (FWHM) of these ranges, color reproducibility is increased when utilized as a color material in a color filter due to high color purity.

The quantum dots may each independently be an organic material, an inorganic material, or a hybrid (mixture) of an organic material and an inorganic material.

The quantum dots may each independently include (e.g., be composed of) a core and a shell around (e.g., surrounding) the core, and the core and the shell may each independently have a structure of a core, core/shell, core/first shell/second shell, alloy, alloy/shell, and/or the like, each composed of Group II-IV elements, Group III-V elements, and/or the like, but embodiments are not limited thereto.

For example, the core may include at least one material selected from CdS, CdSe, CdTe, ZnS, ZnSe, ZnTe, HgS, HgSe, HgTe, GaN, GaP, GaAs, InP, InAs, and an alloy thereof, but the present disclosure is not necessarily limited thereto. The shell around (e.g., surrounding) the core may include at least one material selected from CdSe, ZnSe, ZnS, ZnTe, CdTe, PbS, TiO, SrSe, HgSe, and an alloy thereof, but the present disclosure is not necessarily limited thereto.

In an embodiment, because an interest in the environment has recently been much increased over the whole world, and a regulation of a toxic material has also been fortified (e.g., tightened), a non-cadmium-based light emitting material (InP/ZnS, etc.) having slightly lower (e.g., little low) quantum efficiency (quantum yield) but being environmentally-friendly (instead of a light emitting material having a cadmium-based core) is utilized, but the present disclosure is not necessarily limited thereto.

The structure of the quantum dots is not particularly limited. In the case of the quantum dots of a core/shell structure, an entire size including the shell (an average particle diameter) may be about 1 nm to about 15 nm, for example, about 5 nm to about 15 nm.

For example, the quantum dots may include a red quantum dot, a green quantum dot, or a combination thereof. For example, the quantum dots may include both the green quantum dots and the red quantum dots. Herein, the green quantum dots may be included in a greater content than the red quantum dots. The red quantum dots may have an average particle diameter of about 10 nm to about 15 nm. The green quantum dots may have an average particle diameter of about 5 nm to about 8 nm.

Also, for dispersion stability of the quantum dots, the curable resin composition according to an embodiment may further include a dispersing agent. The dispersing agent helps with the uniform dispersibility of a photo-conversion material such as a quantum dot in the curable composition and may include a non-ionic, anionic, and/or cationic dispersing agent. For example, the dispersing agent may be polyalkylene glycol or esters thereof, a polyoxy alkylene, a polyhydric alcohol ester alkylene oxide addition product, an alcohol alkylene oxide addition product, a sulfonate ester, a sulfonate salt, a carboxylate ester, a carboxylate salt, an alkyl amide alkylene oxide addition product, an alkyl amine and/or the like, and may be utilized alone or in a mixture of two or more. The dispersing agent may be utilized in an amount of about 0.1 wt % to about 100 wt %, for example, about 10 wt % to about 20 wt %, relative to a solid content of the photo-conversion material such as quantum dots.

The quantum dots may be included in an amount of about 1 wt % to about 40 wt %, for example, about 1 wt % to about 30 wt %, based on a total amount of the curable composition. When the quantum dots are included within these ranges, a photo-conversion rate may be improved, and pattern characteristics and development characteristics may not be interfered with, so that the curable composition may have suitable (e.g., excellent) processability.

(B) Polymerizable Compound

The curable composition according to an embodiment includes a polymerizable compound. The polymerizable compound may be mixed with a suitable (e.g., generally-utilized) monomer or oligomer in a related art curable composition.

For example, the polymerizable compound may be a polymerizable monomer having a carbon-carbon double bond at the terminal end.

For example, the polymerizable compound may be a polymerizable monomer having at least one selected from a functional group represented by Chemical Formula 2-1 and a functional group represented by Chemical Formula 2-2 at the terminal end.

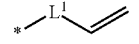

Chemical Formula 2-1

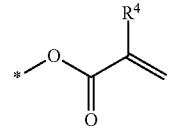

Chemical Formula 2-2

In Chemical Formula 2-1 and Chemical Formula 2-2,
$L^1$ is a substituted or unsubstituted C1 to C20 alkylene group, and
$R^4$ is a hydrogen atom or a substituted or unsubstituted C1 to C20 alkyl group.

The polymerizable compound includes at least one carbon-carbon double bond, for example, at least one selected from the functional group represented by Chemical Formula 2-1 and the functional group represented by Chemical Formula 2-2 at the terminal end, and thus a cross-linking structure with the phosphine group of the compound represented by Chemical Formula 1 may be formed. This formed cross-linking body serves to stabilize the quantum dots as described above.

For example, the polymerizable compound including at least the functional group represented by Chemical Formula 2-1 at the terminal end may include divinyl benzene, triallyl cyanurate, triallyl isocyanurate, triallyl trimelitate, triallyl phosphate, triallyl phosphite, triallyl triazine, diallyl phthalate, or a combination thereof, but the present disclosure is not necessarily limited thereto.

For example, the polymerizable compound including at least the functional group represented by Chemical Formula 2-2 at the terminal end may include ethylene glycoldiacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolacepoxyacrylate, ethylene glycoldimethacrylate, diethylene glycoldimethacrylate, triethylene glycoldimethacrylate, propylene glycoldimethacrylate, 1,4-butanedioldimethacrylate, 1,6-hexanedioldimethacrylate, multi-functional epoxy(meth) acrylate, multi-functional urethane (meth)acrylate, KAYARAD DPCA-20, KAYARAD DPCA-30, KAYARAD DPCA-60, KAYARAD DPCA-120, KAYARAD DPEA-12 of Japan Chemical Co., Ltd., or a combination thereof, but the present disclosure is not necessarily limited thereto.

The polymerizable compound may be treated with acid anhydride to improve developability.

When the curable composition according to an embodiment is a solvent based curable composition including a solvent, the polymerizable compound may be included in an amount of about 1 wt % to about 40 wt %, for example, about 3 wt % to about 30 wt %, based on a total amount of the solvent based curable composition. In addition, when the curable composition according to an embodiment is a non-solvent curable composition that does not include a solvent, the polymerizable compound may be included in an amount of about 10 wt % to about 85 wt %, for example, about 30 wt % to about 80 wt %, based on a total amount of the non-solvent curable composition. When the polymerizable compound is included within these ranges, the polymerizable compound is sufficiently cured during exposure in a pattern-forming process and thus reliability is improved and heat resistance, light resistance, chemical resistance, resolution, and a close contacting (e.g., adhesion) property of a pattern (pixel pattern) may be improved.

(C) Compound Represented by Chemical Formula 1

The curable composition according to an embodiment includes the compound represented by Chemical Formula 1.

The compound represented by Chemical Formula 1 is a phosphine compound, in which the phosphorus atom in the phosphine compound forms a cross-linking body with the aforementioned polymerizable compound and the quantum dot is passivated and stabilized by the lone pair electrons of the phosphorus atom. For example, the cross-linking body of the phosphine compound and the polymerizable compound forms a system that allows passivation of a plurality of quantum dots to suppress quantum dot quenching due to heat and/or light.

In related art, the quantum dot is passivated utilizing a thiol group-containing compound, but utilizing a phosphine compound rather than a thiol group-containing compound has a more desired (e.g., excellent) effect on stabilization of the quantum dot, resulting in improved optical characteristics. For example, when a thiol group is cured by light or heat, the thiol group is lost as the *—SH group is modified (e.g., reacted) into a *—SC—* bond. Because a functional group stabilizing the quantum dot is a thiol group rather than a *—SC—* bond, only the unreacted thiol groups which substantially do not initiate a reaction after photocuring and thermal curing processes may stabilize the quantum dots. That is, in related art, only the thiol groups left unreacted after the photocuring and thermal curing processes may be available to stabilize the quantum dots. However, according to an embodiment, the phosphine compound does not lose the lone pair electrons of the phosphorus atom even after photocuring and/or thermal curing, so that the sites that stabilize the quantum dots are relatively increased (e.g., in comparison with the related art thiol groups), it may thereby contribute to stabilization of the quantum dot greatly. However, the compound represented by Chemical Formula 1 alone cannot perform a curing process and thus may be desirably utilized in combination with the aforementioned polymerizable compound.

On the other hand, in Chemical Formula 1, at least one of $R^1$ to $R^3$ is a substituted or unsubstituted C1 to C20 alkyl group.

For example, in Chemical Formula 1, at least one of $R^1$ to $R^3$ may be a substituted or unsubstituted C1 to C20 alkyl group and at least another one of $R^1$ to $R^3$ may be a hydrogen atom.

For example, in Chemical Formula 1, $R^1$ may be a substituted or unsubstituted C1 to C20 alkyl group and $R^2$ and $R^3$ may each independently be a hydrogen atom.

For example, in Chemical Formula 1, $R^1$ and $R^2$ may each independently be a substituted or unsubstituted C1 to C20 alkyl group and $R^3$ may be a hydrogen atom.

For example, in Chemical Formula 1, $R^1$ to $R^3$ may each independently be a substituted or unsubstituted C1 to C20 alkyl group.

When the curable composition according to an embodiment is a solvent based curable composition including a solvent, the compound represented by Chemical Formula 1 may be included in an amount of about 1 wt % to about 40 wt %, for example, about 3 wt % to about 30 wt %, based on a total amount of the solvent based curable composition. In addition, when the curable composition according to an embodiment is a non-solvent curable composition that does not include a solvent, the compound represented by Chemical Formula 1 may be included in an amount of about 10 wt % to about 85 wt %, for example, about 30 wt % to about 80 wt %, based on a total amount of the non-solvent curable composition. When the Compound represented by Chemical Formula 1 is included within these ranges, it may easily form a cross-linking body with the aforementioned photopolymerizable monomer, further contributing to stabilization of the quantum dot.

(D) Polymerization Initiator

The curable composition according to an embodiment may further include a polymerization initiator, for example, a photopolymerization initiator, a thermal polymerization initiator, or a combination thereof.

The photopolymerization initiator is a suitable (e.g., generally-utilized) initiator for a curable resin composition and may be, for example, an acetophenone-based compound, a benzophenone-based compound, a thioxanthone-based compound, a benzoin-based compound, a triazine-based compound, an oxime-based compound, an aminoketone-based compound, and/or the like, but the present disclosure is not necessarily limited thereto.

Examples of the acetophenone-based compound may be 2,2'-diethoxy acetophenone, 2,2'-dibutoxy acetophenone, 2-hydroxy-2-methylpropiophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and/or the like.

Examples of the benzophenone-based compound may be benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and/or the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and/or the like.

Examples of the benzoin-based compound may be benzoin, benzoin methyl ether, benzoin ethyl ether, benzoin isopropyl ether, benzoin isobutyl ether, benzyldimethylketal, and/or the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloro methyl)-s-triazine, bis(trichloromethyl)-6-styryl-s-triazine, 2-(naphthol-yl)-4,6-bis(trichloromethyl)-s-triazine, 2-(4-methoxynaphthol-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and/or the like.

Examples of the oxime-based compound may be O-acyloxime-based compound, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and/or the like. Non-limiting specific examples of the O-acyloxime-based compound may be 1,2-octandione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and/or the like.

Examples of the aminoketone-based compound may be 2-benzyl-2-dimethylamino-1-(4-morpholinophenyl)-butanone-1, and/or the like.

The photopolymerization initiator may further include a carbazole-based compound, a diketone-based compound, a sulfonium borate-based compound, a diazo-based compound, an imidazole-based compound, a biimidazole-based compound, and/or the like, besides the compounds described above.

The photopolymerization initiator may be utilized with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and/or the like.

Examples of the thermal polymerization initiator may be peroxide, such as enzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, t-butyl peroxybenzoate, and/or the like; azo polymerization initiators, such as 2,2-azo-bis(isobutyronitrile), 2,2'-azobis-2-methylpropinonitrile, and/or the like, but the present disclosure is not necessarily limited thereto and any suitable thermal polymerization initiator (e.g., of which is well known in the art) may be utilized.

The polymerization initiator may be included in an amount of about 0.1 wt % to about 10 wt %, for example, about 0.5 wt % to about 5 wt %, based on a total amount of the curable composition. When the polymerization initiator is included in these ranges, it is possible to obtain suitable (e.g., excellent) reliability due to sufficient curing (during exposure and/or thermal curing) and to reduce or prevent deterioration of transmittance (due to non-reaction initiators), thereby reducing or preventing deterioration of optical characteristics of the quantum dots.

Light Diffusing Agent

The curable composition according to an embodiment may further include a light diffusing agent.

For example, the light diffusing agent may include barium sulfate ($BaSO_4$), calcium carbonate ($CaCO_3$), titanium dioxide ($TiO_2$), zirconia ($ZrO_2$), or a combination thereof.

The light diffusing agent may reflect unabsorbed light in the aforementioned quantum dots and allow the quantum dots to absorb the reflected light again. That is, the light diffusing agent may increase an amount of light absorbed by the quantum dots and increase photo-conversion efficiency of the curable composition.

The light diffusing agent may have an average particle diameter ($D_{50}$) of about 150 nm to about 250 nm, and for example, about 180 nm to about 230 nm. When the average particle diameter of the light diffusing agent is within these ranges, it may have a better light diffusing effect and increase photo-conversion efficiency.

The light diffusing agent may be utilized in the form of a dispersion in which it is dispersed in a solvent for dispersion stability in the curable composition.

The light diffusing agent may be included in an amount of about 0.1 wt % to about 20 wt %, for example, about 1 wt % to about 10 wt %, based on a total amount of the curable composition. When the light diffusing agent is included in these amount ranges, effects of utilizing the light diffusing agent may be expected to improve the photo-conversion efficiency, and the pattern characteristics may be improved.

Other Additives

The curable composition according to an embodiment may further include a polymerization inhibitor including a hydroquinone-based compound, a catechol-based compound, or a combination thereof. The curable composition according to an embodiment may inhibit cross-linking at room temperature during exposure after coating the curable composition by further including the hydroquinone-based compound, the catechol-based compound, or the combination thereof.

For example, the hydroquinone-based compound, the catechol-based compound, or the combination thereof may be hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O, O')aluminum, or a combination thereof, but the present disclosure is not necessarily limited thereto.

The hydroquinone-based compound, the catechol-based compound, or the combination thereof may be utilized in the form of a dispersion. The polymerization inhibitor in the form of the dispersion may be included in an amount of about 0.001 wt % to about 1 wt %, for example, about 0.01 wt % to about 0.1 wt %, based on a total amount of the curable composition (regardless of solvent based or non-solvent based). When the polymerization inhibitor is included in the above described ranges, passage of time at room temperature may be solved and concurrently (or simultaneously) sensitivity deterioration and surface delamination phenomenon may be reduced or prevented. That is, when the polymerization inhibitor is included in these ranges, the room temperature stability of the non-solvent curable composition may be improved, and reduction in curing sensitivity and delamination of the coating layer may both be reduced or prevented.

The curable composition according to an embodiment may further include malonic acid; 3-amino-1,2-propanediol; a silane-based coupling agent; a leveling agent; a fluorine-based surfactant; or a combination thereof, besides the polymerization inhibitor.

For example, the curable composition may further include a silane-based coupling agent having a reactive substituent such as a vinyl group, a carboxyl group, a methacryloxy group, an isocyanate group, an epoxy group and/or the like in order to improve close contacting (e.g., adhesion) properties with a substrate.

Examples of the silane-based coupling agent may be trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, β-epoxycyclohexyl)ethyltrimethoxysilane, and/or the like, and the silane-based coupling agent may be utilized alone or in a mixture of two or more.

The silane-based coupling agent may be utilized in an amount of about 0.01 parts by weight to about 10 parts by weight based on 100 parts by weight of the curable composition (regardless of solvent based or non-solvent based). When the silane-based coupling agent is included within this range, close contacting (e.g., adhesion) properties, storage capability, and/or the like are suitable (e.g., excellent).

In addition, the curable composition may further include a surfactant, for example, a fluorine-based surfactant, as needed in order to improve coating properties and inhibit generation of spots.

Examples of the fluorine-based surfactant may be, BM-1000®, and BM-1100® (BM Chemie Inc.); MEGAFACE F 142D®, MEGAFACE F 172®, MEGAFACE F 173®, and MEGAFACE F 183® Dainippon Ink Kagaku Kogyo Co., Ltd.); FULORAD FC-135®, FULORAD FULORAD FC-170C®, FULORAD FC-430®, and FULORAD FC-431® (Sumitomo 3M Co., Ltd.); SURFLON S-112®, SURFLON S-113®, SURFLON S-131®, SURFLON S-141®, and SURFLON S-145® (ASAHI Glass Co., Ltd.); and SH-28PA, SH-190®, SH-193®, SZ-6032®, and SF-8428®, and/or the like (Toray Silicone Co., Ltd.); and F-482, F-484, F-478, F-554 and/or the like of DIC Co., Ltd.

The fluorine-based surfactant may be included in an amount of about 0.01 parts by weight to about 5 parts by weight based on 100 parts by weight of the curable composition (regardless of solvent based or non-solvent based). When the fluorine-based surfactant is included in this range, coating uniformity may be ensured, staining may not occur, and wetting of the glass substrate may be improved.

The curable composition may further include other additives such as an antioxidant, a stabilizer, and/or the like in a set or predetermined amount, unless desired properties are deteriorated (when these additives are included).

Binder Resin

The curable composition may further include a binder resin.

The binder resin may include an acryl-based binder resin, a cardo-based binder resin, or a combination thereof.

The acryl-based binder resin is a copolymer of a first ethylenic unsaturated monomer and a second ethylenic unsaturated monomer that are copolymerizable with each other, and may be a resin including at least one acryl-based repeating unit.

The first ethylenic unsaturated monomer is an ethylenic unsaturated monomer including at least one carboxyl group, and examples of the monomer include acrylic acid, methacrylic acid, maleic acid, itaconic acid, fumaric acid, and/or a combination thereof.

The first ethylenic unsaturated monomer may be included in an amount of about 5 wt % to about 50 wt %, for example, about 10 wt % to about 40 wt %, based on a total amount of the acryl-based binder resin.

The second ethylenic unsaturated monomer may be an aromatic vinyl compound (such as styrene, α-methylstyrene, vinyl toluene, vinylbenzylmethylether, and/or the like); an unsaturated carboxylate ester compound (such as methyl (meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and/or the like); an unsaturated amino alkyl carboxylate ester compound (such as 2-aminoethyl (meth)acrylate, 2-dimethylaminoethyl(meth)acrylate, and/or the like); a carboxylic acid vinyl ester compound (such as vinyl acetate, vinyl benzoate, and/or the like); an unsaturated glycidyl carboxylate ester compound (such as glycidyl (meth)acrylate, and/or the like); a vinyl cyanide compound (such as (meth)acrylonitrile and/or the like); an unsaturated amide compound (such as (meth)acrylamide, and/or the like); and/or the like, and may be utilized alone or as a mixture of two or more.

Specific examples of the acryl-based binder resin may be a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth)acrylic acid/benzylmethacrylate/styrene/2-hydroxyethylmethacrylate copolymer and/or the like, but the present disclosure is not limited thereto, and the acryl-based resin may be utilized alone or as a mixture of two or more.

The acryl-based binder resin, when utilized in combination with the cardo-based binder resin described below, has a suitable (e.g., great) effect on reducing or preventing deterioration of luminance.

A weight average molecular weight of the acryl-based binder resin may be about 3,000 g/mol to about 150,000 g/mol, for example, about 5,000 g/mol to about 50,000 g/mol, or about 20,000 g/mol to about 30,000 g/mol. When the acryl-based binder resin has a weight average molecular weight within these ranges, the curable composition according to an embodiment may have suitable (e.g., excellent) physical and chemical properties and an appropriate viscosity, and show suitable (e.g., excellent) close-contacting (e.g., adhesion) properties to a substrate.

An acid value of the acryl-based binder resin may be about 15 mgKOH/g to about 60 mgKOH/g, for example, about 20 mgKOH/g to about 50 mgKOH/g. When the acryl-based binder resin has an acid value within these ranges, suitable (e.g., excellent) resolution of a pixel may be obtained.

The acryl-based binder resin may be included in an amount of about 1 wt % to about 30 wt %, for example, about 1 wt % to about 20 wt %, based on a total amount of the curable composition according to an embodiment. When the acryl-based binder resin is included within these ranges, developability may be improved and suitable (e.g., excellent) surface smoothness improvement may be achieved due to improved cross-linking.

The cardo-based resin may include a repeating unit represented by Chemical Formula 3.

Chemical Formula 3

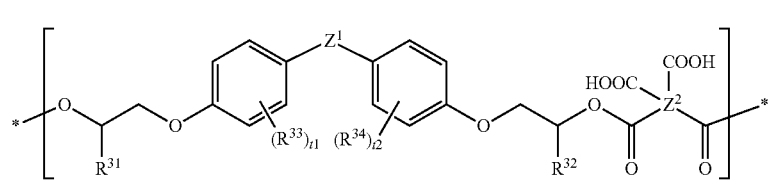

In Chemical Formula 3, $R^{31}$ and $R^{32}$ are each independently hydrogen atom or a substituted or unsubstituted (meth)acryloyloxy alkyl group, $R^{33}$ and $R^{34}$ are each independently hydrogen atom, a halogen atom, or a substituted or unsubstituted C1 to C20 alkyl group, $Z^1$ is a single bond, O, CO, $SO_2$, $CR^{35}R^{36}$, $SiR^{37}R^{38}$ (wherein, $R^{35}$ to $R^{38}$ are each independently a hydrogen atom or a substituted or unsubstituted C1 to C20 alkyl group) or one of linking groups represented by Chemical Formula 3-1 to Chemical Formula 3-11, Chemical Formula 3-1

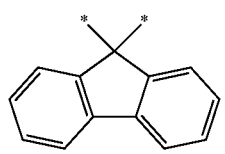

Chemical Formula 3-2

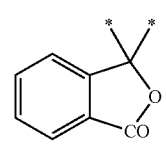

Chemical Formula 3-3

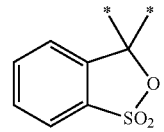

Chemical Formula 3-4

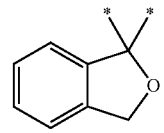

Chemical Formula 3-5

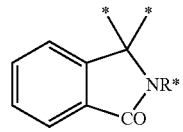

In Chemical Formula 3-5

$R^a$ is a hydrogen atom, an ethyl group, $C_2H_4Cl$, $C_2H_4OH$, $CH_2CH=CH_2$, or a phenyl group.

Chemical Formula 3-6

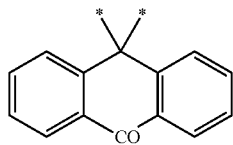

Chemical Formula 3-7

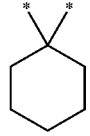

Chemical Formula 3-8

Chemical Formula 3-9

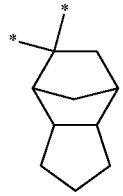

Chemical Formula 3-10

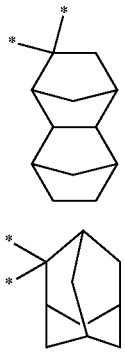

Chemical Formula 3-11

$Z^2$ is an acid anhydride moiety, and t1 and t2 are each independently an integer ranging from 0 to 4.

A weight average molecular weight of the cardo-based binder resin may be about 500 g/mol to about 50,000 g/mol, for example, about 1,000 g/mol to about 30,000 g/mol. When the weight average molecular weight of the cardo-based binder resin is within these ranges, a satisfactory pattern may be formed without a residue during a manufacture of a cured layer (e.g., during the curing process of the coating layer) and without losing a film thickness during development of the solvent based curable composition.

The cardo-based binder resin may include a functional group represented by Chemical Formula 4 at at least one terminal end of the two (i.e., both) terminal ends.

Chemical Formula 4

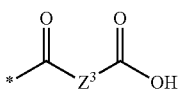

In Chemical Formula 4, $Z^3$ is represented by one of Chemical Formula 4-1 to Chemical Formula 4-7.

Chemical Formula 4-1

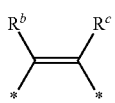

In Chemical Formula 4-1, $R^b$ and $R^c$ are each independently a hydrogen atom, a substituted or unsubstituted C1 to C20 alkyl group, an ester group, or an ether group.

Chemical Formula 4-2

Chemical Formula 4-3

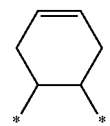

Chemical Formula 4-4

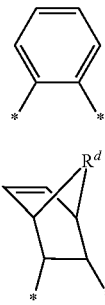

Chemical Formula 4-5

In Chemical Formula 4-5, $R^d$ is O, S, NH, a substituted or unsubstituted C1 to C20 alkylene group, a C1 to C20 alkylamine group, or a C2 to C20 alkenylamine group.

Chemical Formula 4-6

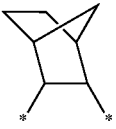

Chemical Formula 4-7

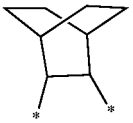

The cardo-based resin may be, for example, prepared by mixing at least two selected from a fluorene-containing compound (such as 9,9-bis(4-oxiranylmethoxyphenyl)fluorene); an anhydride compound (such as benzenetetracarboxylic acid dianhydride, naphthalenetetracarboxylic acid dianhydride, biphenyltetracarboxylic acid dianhydride, benzophenonetetracarboxylic acid dianhydride, pyromellitic dianhydride, cyclobutanetetracarboxylic acid dianhydride, perylenetetracarboxylic acid dianhydride, tetrahydrofurantetracarboxylic acid dianhydride, and/or tetrahydrophthalic anhydride); a glycol compound (such as ethylene glycol, propylene glycol, and/or polyethylene glycol); an alcohol compound (such as methanol, ethanol, propanol, n-butanol, cyclohexanol, and/or benzylalcohol); a solvent-based compound (such as propylene glycol methylethylacetate, and/or N-methylpyrrolidon); a phosphorus compound (such as triphenylphosphine); and an amine or ammonium salt compound (such as tetramethylammonium chloride, tetraethylammonium bromide, benzyldiethylamine, triethylamine, tributylamine, and/or benzyltriethylammonium chlorid).

When the binder resin is a cardo-based resin, the solvent based curable composition including the same has suitable (e.g., excellent) developability and sensitivity during photocuring and thus, may have suitable (e.g., fine) pattern-forming capability.

An acid value of the acryl-based resin may be about 80 mgKOH/g to about 130 mgKOH/g. When the acryl-based resin has the acid value within this range, suitable (e.g., excellent) resolution of a pixel may be obtained.

The binder resin may be included in an amount of about 1 wt % to about 30 wt %, for example, about 1 wt % to about 20 wt %, based on a total amount of the curable composition. When the binder resin is included in these ranges, a curing shrinkage rate may be greatly reduced.

Solvent

If the curable composition according to an embodiment is a solvent based curable composition, it may further include a solvent.

The solvent may include alcohols (such as methanol, ethanol, and/or the like); glycol ethers (such as ethylene glycol methylether, ethylene glycol ethylether, propylene glycol methylether, and/or the like); cellosolve acetates (such as methyl cellosolve acetate, ethyl cellosolve acetate, diethyl cellosolve acetate, and/or the like); carbitols (such as methylethyl carbitol, diethyl carbitol, diethylene glycol monomethylether, diethylene glycol monoethylether, diethylene glycol dimethylether, diethylene glycol methylethylether, diethylene glycol diethylether, and/or the like); propylene glycol alkylether acetates (such as propylene glycol monomethylether acetate, propylene glycol propylether acetate, and/or the like); ketones (such as methylethylketone, cyclohexanone, 4-hydroxy-4-methyl-2-pentanone, methyl-n-propylketone, methyl-n-butylketone, methyl-n-amylketone, 2-heptanone, and/or the like); saturated aliphatic monocarboxylic acid alkyl esters (such as ethyl acetate, n-butyl acetate, isobutyl acetate, and/or the like; lactate esters such as methyl lactate, ethyl lactate, and/or the like); hydroxy acetic acid alkyl esters (such as methyl hydroxyacetate, ethyl hydroxyacetate, butyl hydroxyacetate, and/or the like); acetic acid alkoxyalkyl esters (such as methoxymethyl acetate, methoxyethyl acetate, methoxybutyl acetate, ethoxymethyl acetate, ethoxyethyl acetate, and/or the like); 3-hydroxypropionic acid alkyl esters (such as methyl 3-hydroxypropionate, ethyl 3-hydroxypropionate, and/or the like); 3-alkoxypropionic acid alkyl esters (such as methyl 3-methoxypropionate, ethyl 3-methoxypropionate, ethyl 3-ethoxypropionate, methyl 3-ethoxypropionate, and/or the like); 2-hydroxypropionic acid alkyl ester (such as methyl 2-hydroxypropionate, ethyl 2-hydroxypropionate, propyl 2-hydroxypropionate, and/or the like); 2-alkoxypropionic acid alkyl esters (such as methyl 2-methoxypropionate, ethyl 2-methoxypropionate, ethyl 2-ethoxypropionate, methyl 2-ethoxypropionate, and/or the like); 2-hydroxy-2-methylpropionic acid alkyl esters (such as methyl 2-hydroxy-2-methylpropionate, ethyl 2-hydroxy-2-methylpropionate, and/or the like); 2-alkoxy-2-methylpropionic acid alkyl esters (such as methyl 2-methoxy-2-methylpropionate, ethyl 2-ethoxy-2-methylpropionate, and/or the like); esters (such as 2-hydroxyethyl propionate, 2-hydroxy-2-methylethyl propionate, hydroxyethyl acetate, methyl 2-hydroxy-3-methylbutanoate, and/or the like); or ketonate esters (such as ethyl pyruvate, and/or the like), and in addition, may include N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, cyclohexyl acetate, and/or the like, but the present disclosure is not limited thereto.

For example, the solvent may be desirably glycol ethers (such as ethylene glycol monoethylether, ethylene diglycolmethylethylether, and/or the like); ethylene glycol alkylether acetates (such as ethyl cellosolve acetate, and/or the like); esters (such as 2-hydroxy ethyl propionate, and/or the like); carbitols (such as diethylene glycol monomethylether, and/or the like); propylene glycol alkylether acetates (such as propylene glycol monomethylether acetate, propylene glycol propylether acetate, and/or the like); alcohols (such as ethanol, and/or the like), cyclohexyl acetate, or a combination thereof.

For example, the solvent may be a polar solvent including propylene glycol monomethylether acetate, dipropylene glycol methylether acetate, cyclohexyl acetate, ethanol, ethylene glycoldimethylether, ethylene diglycolmethylethylether, diethylene glycoldimethylether, dimethyl acetamide, dimethyladipate, 2-butoxyethanol, N-methylpyrrolidine, N-ethylpyrrolidine, propylene carbonate, γ-butyrolactone, or a combination thereof.

The solvent may be included in a suitable (e.g., a balanced) amount, for example, about 30 wt % to about 80 wt %, or about 40 wt % to about 80 wt %, based on a total amount of the solvent based curable resin composition. When the solvent is within these ranges, the solvent based curable composition has appropriate viscosity and thus may have suitable (e.g., excellent) coating properties when coated in a large area through spin-coating and/or slit-coating.

Another embodiment provides a resin layer manufactured utilizing the aforementioned curable composition.

A method of manufacturing the resin layer includes coating the aforementioned curable composition (non-solvent curable composition and/or solvent based curable composition) on a substrate with an inkjet spraying method (e.g., an inkjet printing method) to form a pattern (S1); and curing the pattern (S2).

(S1) Formation of Pattern

The curable composition may desirably be coated to be about 0.5 μm to about 20 μm thick on a substrate in an inkjet spraying method. The inkjet spraying method may form a pattern by spraying (e.g., jetting) a single color per each nozzle and thus repeating the spraying as many times as the number of colors needed, but the pattern may be formed by concurrently or simultaneously spraying the number of colors needed through each inkjet nozzle in order to reduce the number of processes. That is, the pattern may be formed by concurrently spraying the number of colors needed through a plurality of nozzles (e.g., each containing one of the colors).

(S2) Curing

The obtained pattern is cured to obtain a pixel. Herein, the curing method may be applied to both of the thermosetting process and the photocuring process. The thermal curing may be performed at greater than or equal to about 100° C., desirably, in a range of about 100° C. to about 300° C., and more desirably, in a range of about 160° C. to about 250° C. The photocuring process may include irradiating an actinic ray such as a UV ray of about 190 nm to about 450 nm, for example, about 200 nm to about 500 nm. The irradiating is performed by utilizing a light source such as a mercury lamp (with a low pressure, a high pressure, or an ultrahigh pressure), a metal halide lamp, an argon gas laser, and/or the like. An X ray, an electron beam, and/or the like may also be utilized as needed.

The other method of manufacturing the resin layer may include manufacturing a cured layer utilizing the aforementioned curable composition (non-solvent curable composition and/or solvent based curable composition) by a lithographic method as follows.

(1) Coating and Film Formation

The aforementioned curable resin composition is coated to have a desired thickness, for example, a thickness ranging from about 2 μm to about 10 μm, on a substrate (which has undergone a set or predetermined pretreatment), utilizing a spin coating method, a slit coating method, a roll coating method, a screen-printing method, an applicator method, and/or the like. Then, the coated substrate is heated at a temperature of about 70° C. to about 90° C. for 1 minute to 10 minutes to remove a solvent and to form a film.

(2) Exposure

The resultant film is irradiated by an actinic ray such as a UV ray of about 190 nm to about 450 nm, for example, about 200 nm to about 500 nm, through a mask with a set or predetermined shape to form a desired pattern. The irradiation is performed by utilizing a light source such as a mercury lamp (with a low pressure, a high pressure, or an ultrahigh pressure), a metal halide lamp, an argon gas laser, and/or the like. An X ray, an electron beam, and/or the like may also be utilized as needed.

Exposure process utilizes, for example, a light dose of less than or equal to about 500 mJ/cm$^2$ (with a 365 nm sensor) when a high pressure mercury lamp is utilized. However, the light dose may vary depending on kinds of each component of the curable composition, their combination ratio, and/or a dry film thickness.

(3) Development

After the exposure process, an alkali aqueous solution is utilized to develop the exposed film by dissolving and removing an unnecessary part except the exposed part, thereby forming an image pattern. In other words, when the alkali developing solution is utilized for the development, a non-exposed region is dissolved, and an image color filter pattern is formed.

(4) Post-Treatment

The developed image pattern may be heated again or irradiated by an actinic ray and/or the like for curing, in order to accomplish suitable (e.g., excellent) quality in terms of heat resistance, light resistance, close contacting (e.g., adhesion) properties, crack-resistance, chemical resistance, high strength, storage stability, and/or the like.

Another embodiment provides a display device including the resin layer.

Hereinafter, the subject matter of the present disclosure is illustrated in more detail with reference to examples. These examples, however, are not in any sense to be interpreted as limiting the scope of the disclosure.

(Preparation of Curable Composition)

Examples 1 to 4 and Comparative Examples 1 to 6

Each curable composition according to Examples 1 to 4 and Comparative Examples 1 to 6 was prepared according to the respective composition listed in Table 1.

(A) Quantum Dot
(A-1) InP/ZnS quantum dot (fluorescence $\lambda_{em}$=635 nm, FWHM=40 nm, Red QD, Hansol Chemical Co., Ltd.)
(A-2) InP/ZnS quantum dot (fluorescence $\lambda_{em}$=538 nm, FWHM=40 nm, Green QD, Hansol Chemical Co., Ltd.)
(B) Polymerizable Compound
(B-1) Triallyl Cyanurate (TCI Inc.)
(B-2) Pentaerythritolhexamethacrylate (DPHA, Nippon Kayaku)
(C) Phosphorus-Containing Compound
(C-1) Compound Represented by Chemical Formula 1-1 (Isobutyl Phosphine, Sigma-Aldrich Corporation)

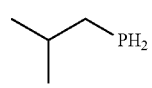

Chemical Formula 1-1

(C-2) Triphenyl Phosphine (Sigma-Aldrich Corporation)
(D) Polymerization Initiator
Diphenyl (2,4,6-trimethylbenzoyl)phosphine oxide (TPO, Sigma-Aldrich Corporation)
(E) Binder Resin
Acryl-based binder resin (SP-RY67-1, SHOWA DENKO)
(F) Solvent
Dimethyladipate (Sigma-Aldrich Corporation)
(G) Diffusing Agent
(G-1) Titanium dioxide (TiO$_2$, SDT89, Iridos Co., Ltd.)
(G-2) Titanium dioxide dispersion (20 wt % of a TiO$_2$ solid content, average particle diameter: 200 nm, Ditto Technology)
(H) Sulfur-containing Compound
Pentaerythritoltetrakis (3-mercaptopropionate, BRUNO BOCK)
(I) Other Additives
Fluorine-based surfactant (F-554, DIG)

TABLE 1

(unit: wt %)

|  |  | Examples |  |  |  | Comparative Examples |  |  |  |  |  |
|---|---|---|---|---|---|---|---|---|---|---|---|
|  |  | 1 | 2 | 3 | 4 | 1 | 2 | 3 | 4 | 5 | 6 |
| (A) Quantum dot | A-1 | 2 | 2 | 1 | 1 | 2 | 2 | 2 | 1 | 1 | 1 |
|  | A-2 | 6 | 6 | 3 | 3 | 6 | 6 | 6 | 3 | 3 | 3 |
| (B) Polymerizable compound | B-1 | 40 | — | 12 | — | 80 | — | 40 | 24 | — | 12 |
|  | B-2 | — | 40 | — | 12 | — | 40 | — | — | 12 | — |
| (C) Phosphorus-containing compound | C-1 | 40 | 40 | 12 | 12 | — | — | — | — | — | — |
|  | C-2 | — | — | — | — | — | — | 40 | — | — | 12 |
| (D) Polymerization initiator |  | 2 | 2 | 1 | 1 | 2 | 2 | 2 | 1 | 1 | 1 |
| (E) Binder resin |  | — | — | 5 | 5 | — | — | — | 5 | 5 | 5 |
| (F) Solvent |  | — | — | 62 | 62 | — | — | — | 62 | 62 | 62 |
| (G) Diffusing agent | G-1 | 7 | 7 | — | — | 7 | 7 | 7 | — | — | — |
|  | G-2 | — | — | 2.5 | 2.5 | — | — | — | 2.5 | 2.5 | 2.5 |
| (H) Sulfur-containing compound |  | — | — | — | — | — | 40 | — | — | 12 | — |
| (I) Other additives |  | 3 | 3 | 1.5 | 1.5 | 3 | 3 | 3 | 1.5 | 1.5 | 1.5 |

Evaluation: Curing Shrinkage Rate and High Light Amount Reliability (Luminance Maintenance Rate) of Composition The curable compositions according to Examples 1 to 4 and Comparative Examples 1 to 6 were each respectively taken by an amount of 15 ml, spin-coated to be about 10 μm thick on a glass substrate by utilizing a spin coater (Opticoat MS-A50, Mikasa Co., Ltd.), and then, prebaked at 100° C. on a hot-plated for 3 minutes (POB I) and subsequently, post-baked (180° C., $N_2$, 30 minutes) (POB II) in two steps, and then, thicknesses thereof in each step were measured to calculate a shrinkage rate. In addition, after POB I, the specimens were each put on 450 nm BLU (Backlight Unit), irradiated with a light dose of 80 mW/cm² for 168 hours, and then, luminance changes thereof on 447 nm BLU were measured by utilizing a CAS spectrometer to calculate luminance maintenance rates after 168 hours relative to initial luminance measurements. The measurement results are shown in Table 2.

TABLE 2

|  | Examples | | | | Comparative Examples | | | | | |
|---|---|---|---|---|---|---|---|---|---|---|
|  | 1 | 2 | 3 | 4 | 1 | 2 | 3 | 4 | 5 | 6 |
| Shrinkage rate after POB I step (%) | 5 | 7 | 10 | 11 | 15 | 17 | 20 | 18 | 19 | 17 |
| Luminance maintenance rate (%) | 93 | 94 | 95 | 96 | 78 | 80 | 81 | 84 | 85 | 78 |

As shown in Table 2, Examples 1 to 4 exhibited a low curing shrinkage rate and a high luminance maintenance rate compared with those of Comparative Examples 1 to 6.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. As used herein, the term "substantially," "about," and similar terms are used as terms of approximation and not as terms of degree, and are intended to account for the inherent deviations in measured or calculated values that would be recognized by those of ordinary skill in the art. Moreover, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, or 35 U.S.C. § 112(a), and 35 U.S.C. § 132(a).

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While this disclosure has been described in connection with what is presently considered to be practical example embodiments, it is to be understood that the subject matter of the present disclosure is not limited to the disclosed embodiments. On the contrary, it is intended to cover various modifications and equivalent arrangements included within the spirit and scope of the appended claims and equivalents thereof. Therefore, the aforementioned embodiments should be understood to be exemplary but not limiting the subject matter of the present disclosure in any way.

What is claimed is:

1. A curable composition comprising:
   a quantum dot;
   a polymerizable compound;
   a compound represented by Chemical Formula 1; and
   a polymerization initiator:

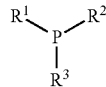

Chemical Formula 1 wherein, in Chemical Formula 1,
$R^1$ to $R^3$ are each independently a hydrogen atom, a substituted or unsubstituted C1 to C20 alkyl group, or a substituted or unsubstituted C6 to C20 aryl group, and at least one of $R^1$ to $R^3$ is a substituted or unsubstituted C1 to C20 alkyl group,
wherein the compound represented by Chemical Formula 1 is about 10 wt % to about 80 wt % based on a total weight of the curable composition, and
the curable composition does not contain any solvent.

2. The curable composition of claim 1, wherein at least one of $R^1$ to $R^3$ is a hydrogen atom.

3. The curable composition of claim 1, wherein the polymerizable compound is a polymerizable monomer having a carbon-carbon double bond at a terminal end of the polymerizable monomer.

4. The curable composition of claim 3, wherein the polymerizable compound is a polymerizable monomer having at least one selected from a functional group represented by Chemical Formula 2-1 and a functional group represented by Chemical Formula 2-2 at the terminal end:

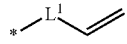

Chemical Formula 2-1

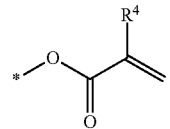

Chemical Formula 2-2 wherein, in Chemical Formula 2-1 and Chemical Formula 2-2, $L^1$ is a substituted or unsubstituted C1 to C20 alkylene group, and $R^4$ is a hydrogen atom or a substituted or unsubstituted C1 to C20 alkyl group.

5. The curable composition of claim 1, wherein the quantum dot is to absorb light in about 360 nm to about 780 nm and emit fluorescence in a wavelength of about 500 nm to about 700 nm.

6. The curable composition of claim 5, wherein the quantum dot comprises a green quantum dot and/or a red quantum dot.

7. The curable composition of claim 1, wherein the curable composition further comprises a light diffusing agent.

8. The curable composition of claim 7, wherein the light diffusing agent comprises barium sulfate, calcium carbonate, titanium dioxide, zirconia, or a combination thereof.

9. The curable composition of claim 1, wherein the curable composition further comprises malonic acid; 3-amino-1,2-propanediol; a silane-based coupling agent; a leveling agent; a fluorine-based surfactant; or a combination thereof.

10. A resin layer comprising the curable composition of claim 1.

11. A display device comprising the resin layer of claim 10.

12. The curable composition of claim 1, wherein at least one selected from $R^1$ to $R^3$ is a substituted or unsubstituted C1 to C20 alkyl group and at least one selected from a remaining $R^1$ to $R^3$ is a hydrogen atom.

13. The curable composition of claim 1, wherein the quantum dot is about 1 wt % to about 40 wt % in amount based on a total weight of the curable composition.

14. The curable composition of claim 1, wherein the compound represented by Chemical Formula 1 is about 1 wt% to about 40 wt% based on a total weight of the curable composition.

15. A method of manufacturing a cured layer, the method comprising:
applying the curable composition of claim 1 onto a substrate by an ink-jet method to form a pattern; and
curing the pattern.

16. A method of manufacturing a cured layer, the method comprising:
applying the curable composition of claim 1 onto a substrate by an ink-jet method to form a pattern;
developing the pattern; and
heat-treating the pattern.

17. The curable composition of claim 1, wherein the curable composition further comprises a binder resin.

18. The curable composition of claim 17, wherein the binder resin comprises an acryl-based binder resin, a cardo-based binder resin, or a combination thereof.

* * * * *